United States Patent
Sly et al.

(10) Patent No.: US 10,884,016 B2
(45) Date of Patent: Jan. 5, 2021

(54) LOW PROFILE AIR DATA SYSTEM ARCHITECTURE

(71) Applicant: Rosemount Aerospace Inc., Burnsville, MN (US)

(72) Inventors: Jaime Sly, Savage, MN (US); Brian Brent Naslund, Chanhassen, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 355 days.

(21) Appl. No.: 16/034,847

(22) Filed: Jul. 13, 2018

(65) Prior Publication Data

US 2020/0018776 A1    Jan. 16, 2020

(51) Int. Cl.
| | | |
|---|---|---|
| *G01K 11/24* | (2006.01) | |
| *G01P 5/24* | (2006.01) | |
| *G01C 9/00* | (2006.01) | |

(52) U.S. Cl.
CPC ............. *G01P 5/245* (2013.01); *G01C 9/005* (2013.01); *G01K 11/24* (2013.01)

(58) Field of Classification Search
CPC .......... G01P 5/245; G01P 5/16; G01P 13/025; G01C 9/005; G01K 11/24; B64D 43/02
See application file for complete search history.

(56) References Cited

U.S. PATENT DOCUMENTS

| | | | |
|---|---|---|---|
| 5,750,891 A | 5/1998 | Brocklehurst | |
| 8,261,610 B2 | 9/2012 | Choisnet | |
| 9,612,252 B2 | 4/2017 | Waddington | |
| 2005/0131591 A1 | 6/2005 | Drutowski et al. | |
| 2012/0118037 A1 | 5/2012 | Leblond et al. | |
| 2020/0018776 A1* | 1/2020 | Sly | G01P 13/025 |

FOREIGN PATENT DOCUMENTS

| | | | | |
|---|---|---|---|---|
| CA | 3048694 A1 * | 1/2020 | ............ | B64D 43/02 |
| EP | 3567373 A1 | 11/2019 | | |
| EP | 3594696 A1 * | 1/2020 | ................ | G01P 5/16 |
| WO | WO 2016062929 A2 | 4/2016 | | |
| WO | WO2016062929 A2 | 4/2016 | | |

OTHER PUBLICATIONS

Translation of WO2016062929 (Year: 2016).*
Extended European Search Report for EP Application No. 19186094.9, dated Dec. 9, 2019, pp. 8.

* cited by examiner

*Primary Examiner* — Daniel Pihulic
(74) *Attorney, Agent, or Firm* — Kinney & Lange, P. A.

(57) ABSTRACT

A system and method for an aircraft includes a low profile pneumatic sensing system and an acoustic sensing system. The low profile pneumatic sensing system includes a pneumatic sensor positioned to sense first sensed data of an airflow about an exterior of the aircraft and does not extend beyond a boundary layer of the aircraft. The first sensed data is used to determine first air data parameters. The acoustic sensing system is configured to emit acoustic signals about the exterior of the aircraft and sense the acoustic signals as second sensed data. The second sensed data is used to determine second air data parameters.

20 Claims, 5 Drawing Sheets

LOW PROFILE AIR DATA SYSTEM ARCHITECTURE

BACKGROUND

The present disclosure relates generally to air data systems, and more particularly to air data systems utilizing low profile pneumatic sensors and acoustic sensors for generating aircraft air data parameter outputs.

Modern aircraft often incorporate air data systems that calculate air data outputs based on measured parameters collected from various sensors positioned about the aircraft. For instance, the air data outputs may include angle of attack (AOA), angle of sideslip (AOS), calibrated airspeed, Mach number, altitude, or other air data parameters.

Traditional air data systems for aircraft include one or more externally mounted Pitot probes in conjunction with local pressure sources. However, Pitot probes project sharply from the aircraft body and thus, introduce increased drag and reduced survivability for the system. Further, prior systems do not utilize dissimilar measurement sources for air data sensing. Thus, if environmental or other conditions lead to failure of one sensor, failure of all sensors for the air data system may be an issue, it is desirable to remove the effect of the sensors on the aerodynamics of the aircraft, and also provide dissimilar, redundant sensing.

SUMMARY

A system for an aircraft includes a low profile pneumatic sensing system and an acoustic sensing system. The low profile pneumatic sensing system includes a pneumatic sensor positioned to sense first sensed data of an airflow about an exterior of the aircraft and does not extend beyond a boundary layer of the aircraft. The first sensed data is used to determine first air data parameters. The acoustic sensing system is configured to emit acoustic signals about the exterior of the aircraft and sense the acoustic signals as second sensed data. The second sensed data is used to determine second air data parameters.

A method includes sensing, by a low profile pneumatic sensing system of an aircraft, first sensed data, and sensing, by an acoustic sensing system, acoustic signals as second sensed data. A first pneumatic sensor of the low profile pneumatic sensing system is positioned within an airflow about an exterior of the aircraft and does not extend beyond a boundary layer of the aircraft. The acoustic sensing system is configured to emit the acoustic signals about the exterior of the aircraft. The method also includes determining first air data parameters based on the first sensed data, and determining second air data parameters based on the second sensed data.

DETAILED DESCRIPTION

As described herein, an example air data system architecture includes at least one low profile pneumatic sensor system and at least one acoustic sensor system to provide one or more sets of air data parameter outputs. The low profile pneumatic sensor system may include a low profile (e.g., semi-flush with the aircraft skin) pneumatic sensor, a plurality of static ports, or a combination thereof. The acoustic sensor system includes at least one acoustic sensor and may also include one or more static ports. The acoustic sensor system may be flush or semi-flush with the skin of the aircraft. The low profile pneumatic sensor system and the acoustic sensor system are each capable of providing air data parameter outputs, and thus, a robust and entirely, flush or semi-flush air data system may be achieved.

Figure 1:
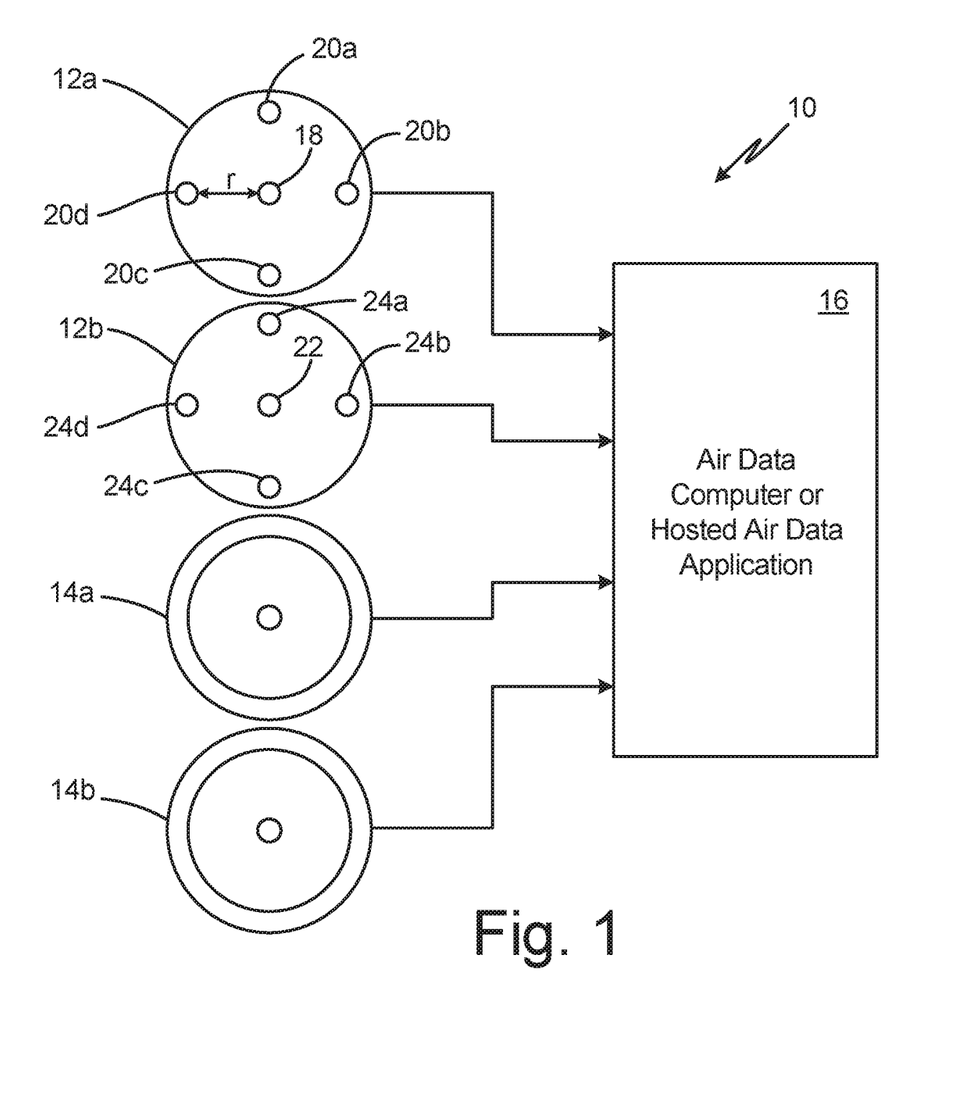
FIG. 1 is a schematic block diagram illustrating an example embodiment of an acoustic sensor system that forms an aircraft air data system.

FIG. 1 is a schematic block diagram illustrating an example embodiment of an acoustic sensor system. Acoustic sensor system 10 includes acoustic sensors 12a and 12b, static ports 14a and 14b, and air data system(s) 16. Sensor system 10 can include any combination of sensors 12a and 12b, and static ports 14a and 14b. When including all of sensors 12a and 12b, and static ports 14a and 14b, a full suite of air data parameters is obtainable for an aircraft that includes system 10. For example, acoustic sensor system 10 is capable, of determining AOA, AOS, static air temperature (SAT), and static pressure. Acoustic sensor 12a includes emitter 18 and microphones 20a-20d, and acoustic sensor 12b includes emitter 22 and microphones 24a-24d. Air data system(s) 16 may include an air data computer, hosted air data application, or any other system capable of receiving sensed data and generating air data parameters. While illustrated and described as acoustic sensors that include an emitter centered within four microphones, other embodiments of acoustic sensors 12a and 12b may include any configuration capable of emitting and receiving acoustic signals. For example, acoustic sensors 12a and 12b may include fewer or greater than four microphones arranged in any manner to sense acoustic signals from emitters 18 and 22. In other embodiments, one or both of acoustic sensors 12a and 12b may include an array of transducers capable of both emitting and receiving acoustic signals.

An acoustic sensor system implemented on an aircraft may include one or more of acoustic sensors 12a and 12b, and static ports 14a and 14b, in any combination, based upon the needs of the aircraft. For example, an aircraft may include only acoustic sensor 12a, which may be positioned at any point on the exterior of the aircraft. In one embodiment, acoustic sensor 12a may be positioned on the side of the aircraft and emitter 18 may emit acoustic signals into the airflow along the side of the aircraft. Each microphone 20a-20d may be positioned to sense the emitted acoustic signals. In one example embodiment, the acoustic signals may be acoustic pulses emitted at any desired frequency. For example, acoustic sensor 12a may be an ultrasonic acoustic sensor, emitting pulses at greater than 20 kHz. In other embodiments, acoustic sensor 12a may be configured to emit pulses in the audible range. In other embodiments, acoustic sensor 12a may be configured to emit a continuous sound wave rather than pulses.

In the example embodiment illustrated in FIG. 1, microphones 20a and 20c are orthogonal to microphones 20b and 20d. The distance (r) between emitter 18 and each microphone 20a-20d is known. The distance between each microphone 20a-20d and emitter 18 may be equal, or may vary for each microphone 20a-20d. For example, the distance (r) between each microphone 20a-20d and emitter 18 may be between 4 and 5 inches. In this embodiment, if acoustic sensor 12a is an ultrasonic sensor configured to emit acoustic pulses at 40 kHz, it will take on the order of 200 to 5000 microseconds, depending upon airflow and ambient conditions, for each acoustic pulse to reach each microphone 20a-20d.

Knowing the distance (r) between each microphone 20a-20d and emitter 18, time of flight for the acoustic signals can be determined for each microphone 20a-20d. Using two microphones along the same axis, the speed of sound in the direction of the two microphones can be determined. For example, acoustic sensor 12a may be positioned on the right side of the aircraft. For an aircraft in the u-v-w three-dimensional space (e.g., the u axis extends along the body and through the nose of the aircraft, the v axis extends out through the side of the aircraft, and the w axis extends through the bottom of the aircraft), acoustic sensor 12a is positioned in the u-w geometric plane. Thus, microphones 20a and 20c can be used to obtain a velocity in the w axis direction, and microphones 20b and 20d can be used to obtain a velocity in the u axis direction. These two velocities can be used to form a two-dimensional velocity vector for the u-w plane. Because acoustic sensor 12a is on the side of the aircraft, the two-dimensional velocity, vector can be used to determine an AOA for the aircraft.

In another embodiment, acoustic sensor 12a may be positioned on the top or bottom of the aircraft. For example, acoustic sensor 12a may be positioned on the top of the aircraft in the geometric u-v plane. In this embodiment, microphones 20a and 20c can be used to determine a velocity in the u axis direction, and microphones 20b and 20d can be used to determine a velocity in the v axis direction. Because acoustic sensor 12a is on the top of the aircraft, the two-dimensional velocity vector for the u-v plane can be used to determine an AOS for the aircraft.

Acoustic sensor 12a is also capable of providing a static air temperature, regardless of the position on the exterior of the aircraft. Two microphones along the same axis, such as microphones 20a and 20c, may be used to sense the acoustic signals from emitter 18. Microphone 20c may sense the time of flight of the acoustic signals upstream of emitter 18 and microphone 20a may sense the time of flight of the acoustic signals downstream of emitter 18. Knowing the distance between microphones 20a and 20c, the speed of sound may be determined, which can then be used to calculate the air temperature. Thus, an aircraft system that includes only a single acoustic sensor is capable of providing parameter outputs that include a two-dimensional velocity vector and a static air temperature. The two-dimensional velocity vector can be used to determine either AOA or AOS, depending upon the physical location of the acoustic sensor on the aircraft.

Figure 2A:
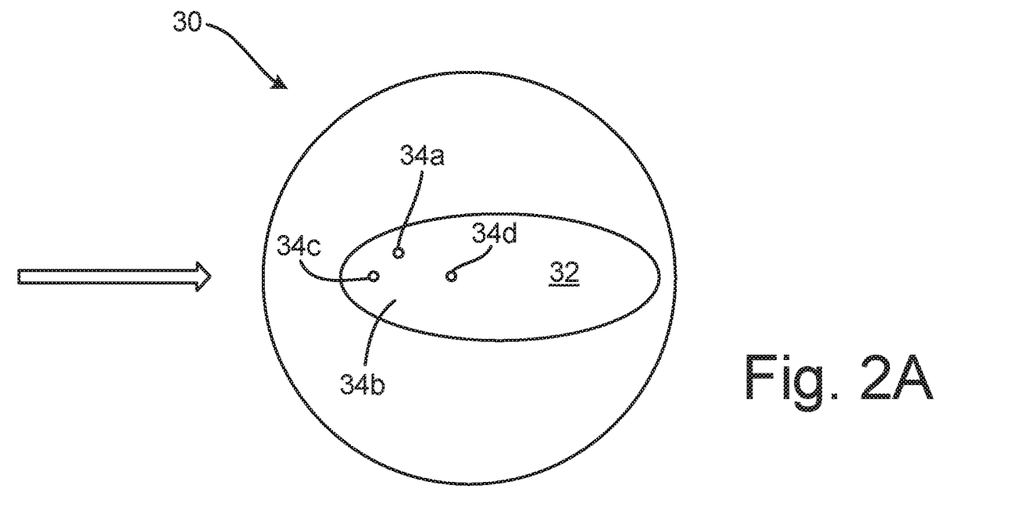
FIGS. 2A and 2B are schematic diagrams illustrating an example embodiment of a low profile pneumatic sensor.

In another embodiment, in addition to the first acoustic sensor 12a, a second acoustic sensor 12b may be positioned on the aircraft in a geometric plane different from acoustic sensor 12a. For example, and as illustrated in FIG. 2A, the first acoustic sensor 12a may be implemented on the top or bottom of the aircraft in the u-v plane, while the second acoustic sensor 12b may be implemented on the side of the aircraft in the u-w plane. Acoustic sensor 12b may operate in a substantially similar manner to acoustic sensor 12a. Acoustic sensor 12a is capable of obtaining the two-dimensional velocity vector in the u-v plane and acoustic sensor 12b is capable of obtaining a two-dimensional velocity vector in the u-w plane. The two two-dimensional velocity vectors from the two respective acoustic sensors 12a and 12b allow the acoustic system to determine both AOA and AOS.

In addition to one or both of acoustic sensors 12a and 12b, one or both of static pressure ports 14a and 14b may be included on the exterior of the aircraft. For example, static pressure port 14a may be positioned on the left side of the aircraft and static pressure port 14b may be positioned on the right side of the aircraft to sense static pressure. Therefore, using acoustic sensors 12a and 12b, and static pressure ports 14a and 14b, air data systems 16 can generate a full suite of aircraft air data parameters. In other embodiments, acoustic sensors 12a and 12b may include integrated static pressure ports, or may be configured to determine static pressure acoustically, eliminating the need for separate static ports 14a and 14b.

Figure 2B:
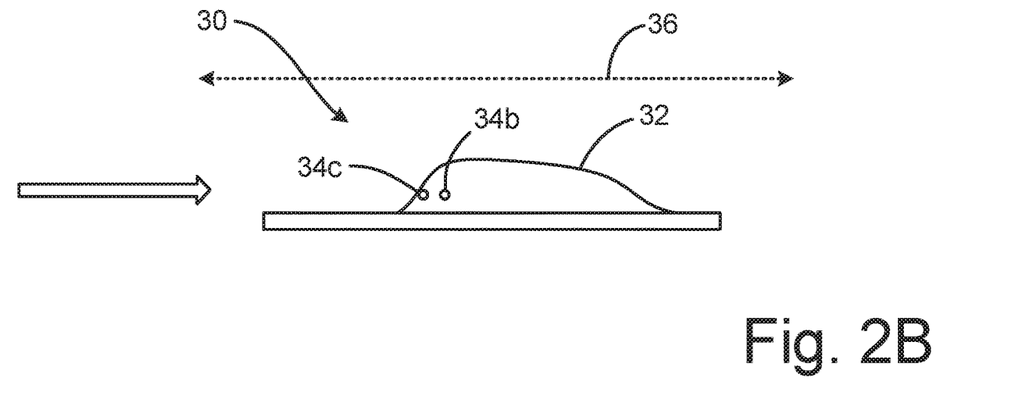

FIGS. 2A and 2B are schematic diagrams illustrating an example embodiment of a low profile pneumatic sensor 30. low profile pneumatic sensor 30 includes low profile bump 32 and sensing ports 34a-34d. The direction of airflow is illustrated by the arrows in FIGS. 2A and 2B. As seen in FIG. 2B, low profile bump 32 does not extend beyond boundary layer 36 of the aircraft (shown in FIGS. 3A and 3B). Boundary layer 36 is the region near the aircraft body where the free stream air is affected by viscous forces which distort the flow. Because low profile bump 32 does not extend beyond boundary layer 36, there is minimal increased drag created by low profile pneumatic sensor 30.

Ports 34a and 34b may be pneumatic pressure ports connected to a differential pressure sensor (not shown), for example. The difference in pressure at ports 34a and 34b may be used to determine an angle of attack (AOA) or an angle of sideslip (AOS), for example, depending upon the location of low profile bump 32 on the exterior of the aircraft. For example, if low profile bump 32 is placed on the side of the aircraft, AOA may be measured, while AOS may be measured if low profile bump 32 is placed on the top or bottom of the aircraft.

Port 34c may be utilized to sense a static pressure, for example, and port 34d may be used to sense a total, or pilot, pressure. Each of these ports may be connected to individual pressure sensors (not shown), for example. While illustrated as four ports 34a-34d, any number of pressure sensing ports may be included in low profile bump 32. The pressures measured using ports 34a-34d may be utilized to determine air data parameters for the aircraft. Ports 34a-34d may be connected to pressure sensors and/or other instrumentation packaged below low profile bump 32. Examples of packaging and configuration of these sensors may be found in U.S. Pat. No. 6,550,344, which is incorporated herein by reference in its entirety. Thus, one of low profile pneumatic sensors 30 can be used to determine total pressure, static pressure, and AOA or AOS.

Figure 3A:
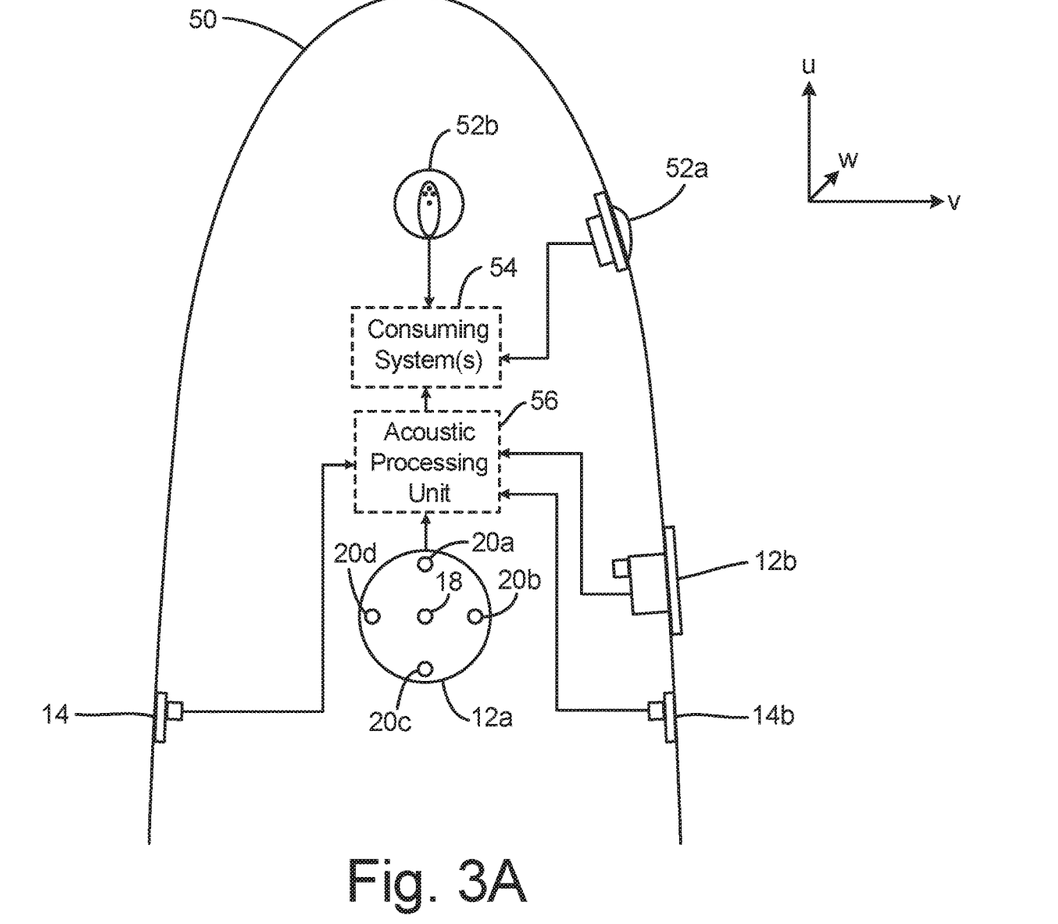
FIGS. 3A and 3B are schematic diagrams illustrating a semi-flush aircraft air data architecture according to an embodiment.
Figure 3B:
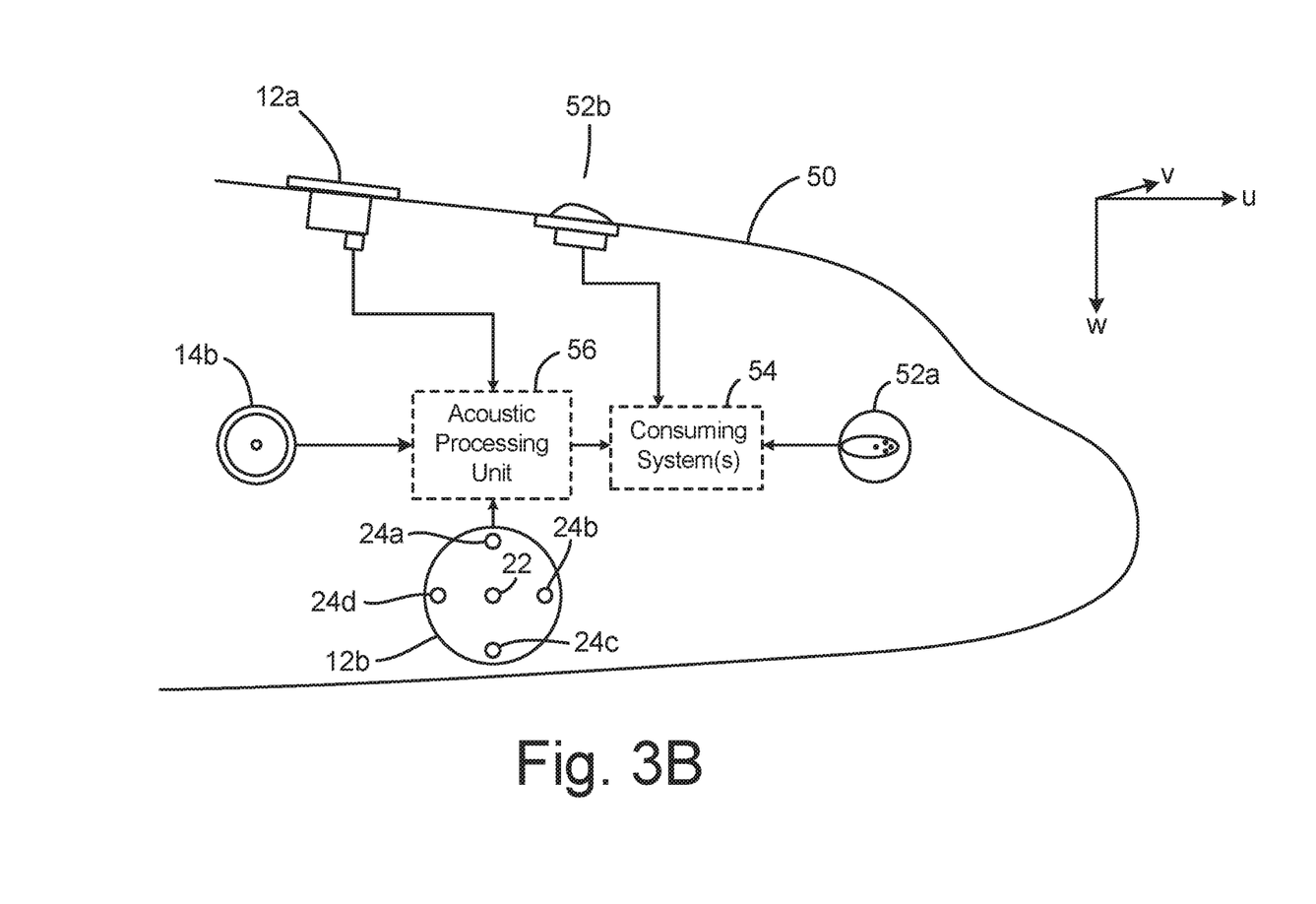

FIGS. 3A and 3B are schematic block diagrams illustrating an example semi-flush air data system architecture for aircraft 50 that includes acoustic sensors 12a and 12b, static ports 14a and 14b, and low profile pneumatic sensors 52a and 52b. FIG. 3A is a top-down view of aircraft 50 in the u-v plane and FIG. 3B is a side view of aircraft 50 in the u-w plane. FIGS. 3A and 3B will be discussed together. The system illustrated in FIGS. 3A and 3B is a semi-flush system in that the components are not flush with the skin of aircraft 50, but do not extend beyond the boundary layer of aircraft 50, creating a minimal impact on aircraft aerodynamics. The acoustic sensor system of aircraft 50 includes acoustic sensors 12a and 12b, and static ports 14a and 14b, while the low profile pneumatic sensor system includes low profile pneumatic sensors 52a and 52b. These systems may be used to generate a single set of air data parameters, or may be used to generate two or more individual sets of air data parameters.

Acoustic sensor 12a includes emitter 18 configured to emit acoustic signals into the airflow, and microphones 20a-20d are positioned and configured to sense the acoustic signals from emitter 18. Acoustic sensor 12b includes emitter 22 configured to emit acoustic signals into the airflow, and microphones 24a-24d are positioned and configured to sense the acoustic signals from emitter 22. As illustrated in FIG. 3A, acoustic sensors 12a and 12b, and static ports 14a and 14b form an air data system that provides aircraft air data parameter outputs that are generated based in part upon time of flight measurements of the acoustic signals emitted by emitter 18, as discussed above. While illustrated in FIG. 3A as including all of acoustic sensors 12a and 12b, and static ports 14a and 14b, aircraft 50 may include any combination of acoustic sensors 12a and/or 12b, and/or static ports 14a and/or 14b.

Acoustic processing unit 56 is electrically coupled to send (and, in some examples, receive) data to/from consuming systems 54, Consuming systems 54 can include aircraft systems, such as flight management systems, auto-flight control systems, standby instrument systems, display systems, data concentrator units, or other consuming systems of air data parameter outputs. Connections illustrated in FIGS. 3A and 3B can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, Ethernet, or other analog or digital communication protocols. In other embodiments, some of the connections illustrated in FIGS. 3A and 3B may be pneumatic.

Acoustic processing unit 56 may be any computer, microprocessor, controller, or other digital circuit configured to calculate air data parameters based on sensed data from acoustic sensors 12a and 12b, and static ports 14a and 14b. In the embodiment illustrated in FIGS. 3A and 3B, sensed analog data is provided to acoustic processing unit 56, which converts the analog data into digital data, and calculates the air data parameters using the digital data. The air data parameter outputs from acoustic processing unit 56 are provided to consuming systems 54. In other embodiments, acoustic sensors 12a and 12b, and/or static ports 14a and 14b may include local processing circuitry to supplement and/or eliminate the need for acoustic processing unit 56. For example, acoustic sensor 12a may include a local processor such that data from acoustic sensor 12b and static ports 14a and 14b can be provided to the local processor of acoustic sensor 12a for calculation of the air data parameter outputs. The local processor of acoustic sensor 12a can then provide the air data parameter outputs directly to consuming systems 54. In further embodiments, acoustic sensors 12a and 12b, and/or static ports 14a and 14b may be connected directly to consuming systems 54, eliminating the need for acoustic processing unit 56.

In operation of aircraft 50, low profile pneumatic sensors 52a and 52b are positioned to receive airflow and sense one or more of a total (or pitot) pressure, a static pressure, AOA, and AOS. Low profile pneumatic sensor 52a is located on the side of aircraft 50 and capable of sensing AOA of aircraft 50. Low profile pneumatic sensor 52b, which may function in a similar manner to low profile pneumatic sensor 52a, rimy be positioned on the top or bottom of the aircraft to sense AOS. Thus, between low profile pneumatic sensors 52a and 52b, air data parameters may be sensed that include total pressure, static pressure, AOA, and AOS. Each of the above sensed values may be provided to consuming systems 54, or determined by consuming systems 54 using raw signals provided by the above components.

Consuming systems 54 may generate air data parameters based on the sensed values from low profile pneumatic sensors 52a and 52b. In one embodiment, low profile pneumatic sensors 52a and 52b may be used by consuming systems 54 to generate first air data parameters, while acoustic sensors 12a and 12b, and static pressure ports 14a and 14b, as described above, may form an additional air data system for aircraft 50 that provides, for example, second aircraft air data parameters. For the first air data parameters, temperature may be sensed by a separate (not shown) sensor, or shared with consuming systems 54 from acoustic processing unit 56. Local flow calibration may be performed for the acoustic system by acoustic processing unit 56, or by other software implemented elsewhere on aircraft 50.

The embodiment illustrated in FIGS. 3A and 3B may provide a single set of air data parameters, or may provide two provide separate, individual, sets of air data parameters. For example, low profile pneumatic sensors 52a and 52b may be used to determine a first set of air data parameters, and acoustic sensors 12a and 12b may be used to provide a second set of air data parameters. Other embodiments may include fewer or greater than two air data systems. For example, aircraft 50 may include further low profile pneumatic sensors in order to provide a third, independent, air data system. In this example embodiment, a further low profile pneumatic sensor may be placed on one of the sides of the aircraft, and another low profile pneumatic sensor may be placed on the top or bottom of the aircraft to generate the third set of air data parameters.

Consuming systems 54, in some examples, utilize each of the independent aircraft air data parameter outputs, alone or in combination, as part of a primary aircraft air data set. For instance, one or more of consuming systems 54 (e.g., a flight management system, an auto-flight control system, or any one or more other consuming systems) can utilize each of the independent aircraft air data parameter outputs in a voting scheme to select one or more of the independent air data parameter outputs for active use by consuming systems 54.

In some examples, one or more of consuming systems 54 can identify the presence of a failure condition in one or more of the independent air data systems based on a comparison of the independent air data parameter outputs. For instance, in an embodiment that includes three independent air data sets, a scenario may exist in which only two of the first, second, and third aircraft air data parameter outputs agree (e.g., include parameter output values that are within a threshold deviation). In this scenario, consuming systems 54 can identify the presence of a failure condition in the remaining one of the first, second, and third air data systems that provides air data parameter outputs that do not agree (e.g., includes parameter output values that are not within the threshold deviation from the remaining two systems). Consuming systems 54 can refrain from utilizing air data parameter outputs from the identified air data system having the failure condition, thereby increasing integrity of the air data parameter outputs utilized for, e.g., flight control functions of aircraft 50. In addition, consuming systems 54 can, in certain examples, store, annunciate, or otherwise indicate the presence of the failure condition in the identified air data system, thereby facilitating maintenance operations on components of the identified air data system having the failure condition.

In some examples, consuming systems 54 include one or more standby (or backup) instruments or components, such as a standby flight display unit, that are utilized by flight control systems, pilots, or other systems in the event of a failure condition of designated primary air data system components. In certain examples, one or more of the aircraft air data parameter output sets can be provided to the standby instruments or components for use by, e.g., a pilot, in the event of degraded operation of designated primary instruments and/or components. For instance, the acoustic aircraft air data parameter outputs provided by the acoustic air data system (e.g., formed by acoustic sensors 12a and 12b, and static ports 14a and 14b) can be provided to the standby instruments or components.

As such, an air data system architecture implementing techniques described herein provides one or more independent air data systems formed by a low profile pneumatic sensor system that includes low profile pneumatic sensors 52a and 52b, and an acoustic sensor system that includes acoustic sensors 12a and 12b and static ports 14a and 14b. Acoustic technology provided by acoustic sensors 12a and 12b used to form the acoustic air data system provides aircraft air data parameter outputs using dissimilar measurements as compared with the pneumatic measurements of low profile sensors 52a and 52b. Accordingly, techniques of this disclosure can help to increase dissimilarity of the air data systems, reducing the impact of common-mode failures of the pneumatic and/or acoustic systems.

Figure 4:
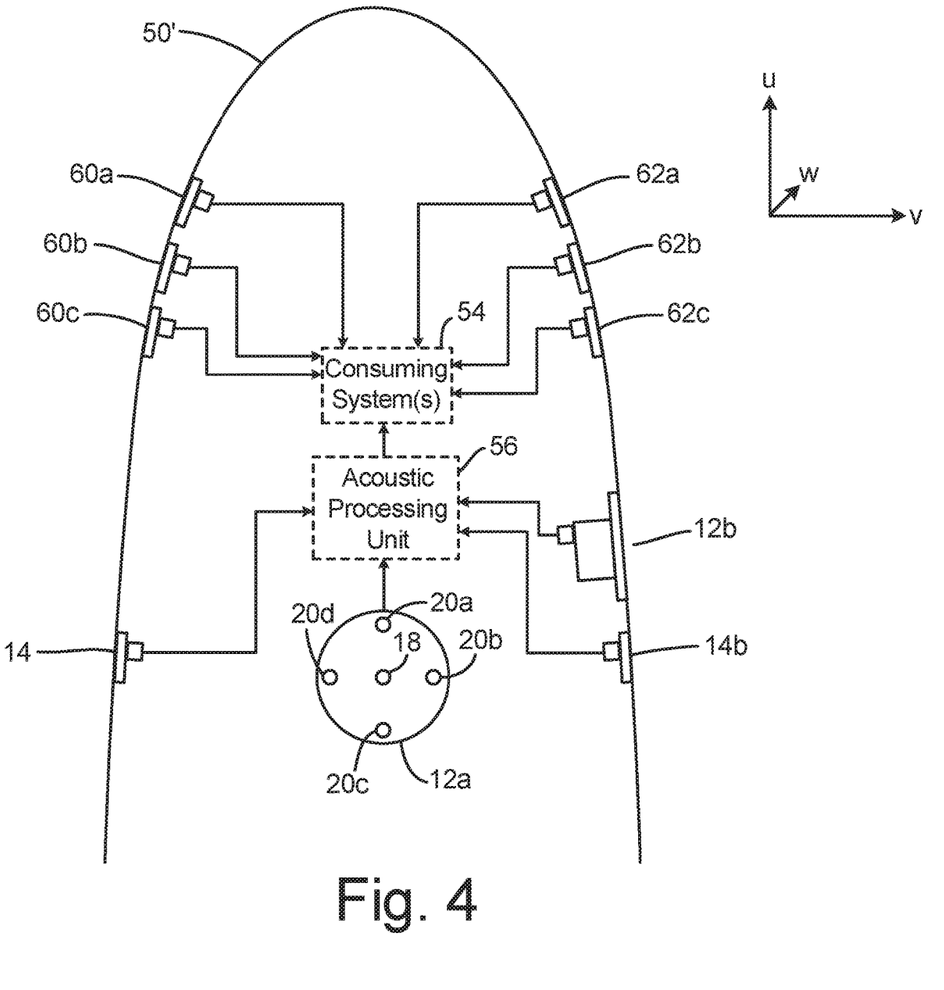
FIG. 4 is a schematic diagram illustrating a flush aircraft air data architecture according to an embodiment.

FIG. 4 is a schematic diagram illustrating an example flush air data system architecture for aircraft 50' including acoustic sensors 12a and 12b, and static ports 14a and 14b, 60a-60c, and 62a-62c. The flush air data system for aircraft 50' may operate in a substantially similar way to that of the embodiment illustrated in FIGS. 3A and 3B. In the embodiment illustrated in FIG. 4, all air data sensors are flush with the skin of the aircraft, resulting in no impact on the aerodynamics of aircraft 50'.

Static ports 60a-60c and 62a-62c may operate as an air data system providing air data parameter outputs. Static pressure is provided from each port to consuming system 54, which is capable of determining airspeed, altitude, AOA, and AOS from the sensed static pressures. While illustrated as a commercial aircraft with static ports 60a-60c and 62a-62c on each side of the fuselage, other aircraft with other shapes may include different configurations and/or positions of static ports 60a-60c and 62a-62c, as long as the static pressures provided enable calculation of the desired air data parameters. While illustrated as six static pressure ports, any number of ports may be implemented based on the desired air data parameters and the needs of the system. Also, while illustrated as a separate embodiment, static ports 60a-60c and 62a-62c may also be added to the embodiment illustrated in FIGS. 3A and 3B to provide a third individual set of air data parameter outputs.

DISCUSSION OF POSSIBLE EMBODIMENTS

The following are non-exclusive descriptions of possible embodiments of the present invention.

A system for an aircraft includes a low profile pneumatic sensing system and an acoustic sensing system. The low profile pneumatic sensing system includes a pneumatic sensor positioned to sense first sensed data of an airflow about an exterior of the aircraft and does not extend beyond a boundary layer of the aircraft. The first sensed data is used to determine first air data parameters. The acoustic sensing system is configured to emit acoustic signals about the exterior of the aircraft and sense the acoustic signals as second sensed data. The second sensed data is used to determine second air data parameters.

The system of the preceding paragraph can optionally include, additionally and/or alternatively, any one or more of the following features, configurations and/or additional components:

A further embodiment of the foregoing system, wherein the first pneumatic sensor comprises a low profile bump that protrudes from the aircraft exterior and includes a first port for sensing an impact pressure.

A further embodiment of any of the foregoing systems, wherein the first pneumatic sensor further comprises first and second angle of attack ports for sensing a differential pressure utilized to determine an angle of attack of the aircraft.

A further embodiment of any of the foregoing systems, wherein the first pneumatic sensor further comprises a static port configured to measure a static pressure external to the aircraft.

A further embodiment of any of the foregoing systems, further including an acoustic processing unit configured to receive the second sensed data from the acoustic sensor system and generate the second air data parameters based on the sensed data.

A further embodiment of any of the foregoing systems, further including at least one consuming system of the aircraft, wherein the consuming system is configured to receive the first sensed data and determine the first air data parameters, and is further configured to receive the second air data parameters from the acoustic processing unit.

A further embodiment of any of the foregoing systems, wherein the acoustic sensor system includes a first acoustic sensor that includes an emitter, and first, second, third, and fourth microphones, wherein the first and second microphones are orthogonal to the third and fourth microphones.

A further embodiment of any of the foregoing systems, wherein the acoustic sensor system includes a first acoustic sensor and a second acoustic sensor, and wherein the first acoustic sensor is positioned on the exterior of the aircraft and lies in a first geometric plane, and the second acoustic sensor is positioned on the exterior of the aircraft and lies in a second geometric plane, different from the first geometric plane.

A further embodiment of any of the foregoing systems, wherein the second air data parameters include angle of attack, angle of sideslip, an airspeed, and an air temperature.

A further embodiment of any of the foregoing systems, wherein the first and second acoustic sensors are ultrasonic acoustic sensors, and wherein the acoustic signal comprises acoustic pulses.

A further embodiment of any of the foregoing systems, wherein the acoustic sensor system further includes at least one static port positioned to sense a static pressure of an airflow about the exterior of the aircraft.

A further embodiment of any of the foregoing systems, wherein the first pneumatic sensor is a first static port configured to sense a first static pressure of an airflow about the exterior of the aircraft, and wherein the low profile sensing system further includes second and third static ports, wherein the first, second, and third static ports are positioned at a first location on the aircraft; and fourth, fifth, and sixth static ports positioned at a second location on the aircraft opposite the first location.

A method includes sensing, by a low profile pneumatic sensing system of an aircraft, first sensed data, and sensing, by an acoustic sensing system, acoustic signals as second sensed data. A first pneumatic sensor of the low profile pneumatic sensing system is positioned within an airflow about an exterior of the aircraft and does not extend beyond a boundary layer of the aircraft. The acoustic sensing system is configured to emit the acoustic signals about the exterior of the aircraft. The method also includes determining first air data parameters based on the first sensed data, and determining second air data parameters based on the second sensed data.

The method of the preceding paragraph can optionally include, additionally and/or alternatively, any one or more of the following features, configurations and/or additional components:

A further embodiment of the foregoing method, wherein the first pneumatic sensor comprises a low profile bump that protrudes from the aircraft exterior, and wherein sensing, by the low profile pneumatic sensing system, first sensed data includes sensing, by a first port located in the low profile bump, a total pressure; sensing, second and third ports located in the low profile bump, a differential pressure utilized to determine an angle of attack or an angle of sideslip of the aircraft; and sensing, by a fourth port located in the low profile bump, a static pressure external to the aircraft.

A further embodiment of any of the foregoing methods, wherein determining the second air data parameters based on the second sensed data comprises generating, by an acoustic processing unit configured to receive the second sensed data from the acoustic sensor system, the second air data parameters based on the second sensed data.

A further embodiment of any of the foregoing methods, wherein determining the first air data parameters based on the first sensed data comprises generating, by at least one consuming system of the aircraft configured to receive the first sensed data from the low profile pneumatic sensor system, the first air data parameters based on the first sensed data.

A further embodiment of any of the foregoing methods, further including combining the first and the second air data parameters into a single set of air data parameters; and providing the single set of air data parameters to at least one consuming system of the aircraft.

A further embodiment of any of the foregoing methods, wherein sensing, by the acoustic sensing system, the acoustic signals as second sensed data includes sensing, by a first acoustic sensor, first signals of the acoustic signals, wherein the first acoustic sensor is positioned on the exterior of the aircraft and lies in a first geometric plane; and sensing, by a second acoustic sensor, second signals of the acoustic signals, wherein the second acoustic sensor is positioned on the exterior of the aircraft and lies in a second geometric plane, different from the first geometric plane.

A further embodiment of any of the foregoing methods, wherein determining the second air data parameters comprises determining angle of attack, angle of sideslip, an airspeed, and an air temperature based on the second sensed data.

A further embodiment of any of the foregoing methods, wherein sensing, by the low profile pneumatic sensing system of the aircraft, the first sensed data includes sensing, by first, second, and third static ports positioned at a first location on the aircraft, first data of the first sensed data; and sensing, by fourth, fifth, and sixth static ports positioned at a second location on the aircraft opposite the first location, second data of the first sensed data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for an aircraft, the system comprising:
a low profile pneumatic sensing system comprising:
a first pneumatic sensor positioned to sense first sensed data of an airflow about an exterior of the aircraft, wherein the first pneumatic sensor does not extend beyond a boundary layer of the aircraft, and wherein the first sensed data is used to determine first air data parameters; and
an acoustic sensing system configured to emit acoustic signals about the exterior of the aircraft and sense the acoustic signals as second sensed data, wherein the second sensed data is used to determine second air data parameters.

2. The system of claim 1, wherein the first pneumatic sensor comprises a low profile bump that protrudes from the aircraft exterior and includes a first port for sensing an impact pressure.

3. The system of claim 2, wherein the first pneumatic sensor further comprises first and second angle of attack ports for sensing a differential pressure utilized to determine an angle of attack of the aircraft.

4. The system of claim 3, wherein the first pneumatic sensor further comprises a static port configured to measure a static pressure external to the aircraft.

5. The system of claim 1, further comprising:
an acoustic processing unit configured to receive the second sensed data from the acoustic sensor system and generate the second air data parameters based on the sensed data.

6. The system of claim 5, further comprising:
at least one consuming system of the aircraft, wherein the consuming system is configured to receive the first sensed data and determine the first air data parameters, and is further configured to receive the second air data parameters from the acoustic processing unit.

7. The system of claim 1, wherein the acoustic sensor system comprises:
a first acoustic sensor that includes an emitter, and first, second, third, and fourth microphones, wherein the first and second microphones are orthogonal to the third and fourth microphones.

8. The system of claim 1, wherein the acoustic sensor system comprises:
a first acoustic sensor; and
a second acoustic sensor;
wherein the first acoustic sensor is positioned on the exterior of the aircraft and lies in a first geometric plane, and the second acoustic sensor is positioned on the exterior of the aircraft and lies in a second geometric plane, different from the first geometric plane.

9. The system of claim 8, wherein the second air data parameters include angle of attack, angle of sideslip, an airspeed, and an air temperature.

10. The system of claim 8, wherein the first and second acoustic sensors are ultrasonic acoustic sensors, and wherein the acoustic signal comprises acoustic pulses.

11. The system of claim 8, wherein the acoustic sensor system further comprises:
   at least one static port positioned to sense a static pressure of an airflow about the exterior of the aircraft.

12. The system of claim 1, wherein the first pneumatic sensor is a first static port configured to sense a first static pressure of an airflow about the exterior of the aircraft, and wherein the low profile sensing system further comprises:
   second and third static ports, wherein the first, second, and third static ports are positioned at a first location on the aircraft; and
   fourth, fifth, and sixth static ports positioned at a second location on the aircraft opposite the first location.

13. A method comprising:
   sensing, by a low profile pneumatic sensing system of a aircraft, first sensed data, wherein a first pneumatic sensor of the low profile pneumatic sensing system is positioned within an airflow about an exterior of the aircraft and does not extend beyond a boundary layer of the aircraft;
   determining first air data parameters based on the first sensed data;
   sensing, by an acoustic sensing system, acoustic signals as second sensed data, wherein the acoustic sensing system is configured to emit the acoustic signals about the exterior of the aircraft; and
   determining second air data parameters based on the second sensed data.

14. The method of claim 13, wherein the first pneumatic sensor comprises a low profile bump that protrudes from the aircraft exterior, and wherein sensing, by the low profile pneumatic sensing system, first sensed data comprises:
   sensing, by a first port located in the low profile bump, a total pressure;
   sensing, second and third ports located in the low profile bump, a differential pressure utilized to determine an angle of attack or an angle of sideslip of the aircraft; and
   sensing, by a fourth port located in the low profile bump, a static pressure external to the aircraft.

15. The method of claim 13, wherein determining the second air data parameters based on the second sensed data comprises generating, by an acoustic processing unit configured to receive the second sensed data from the acoustic sensor system, the second air data parameters based on the second sensed data.

16. The method of claim 15, wherein determining the first air data parameters based on the first sensed data comprises generating, by at least one consuming system of the aircraft configured to receive the first sensed data from the low profile pneumatic sensor system, the first air data parameters based on the first sensed data.

17. The method of claim 13, further comprising:
   combining the first and the second air data parameters into a single set of air data parameters; and
   providing the single set of air data parameters to at least one consuming system of the aircraft.

18. The method of claim 13, wherein sensing, by the acoustic sensing system, the acoustic signals as second sensed data comprises:
   sensing, by a first acoustic sensor, first signals of the acoustic signals, wherein the first acoustic sensor is positioned on the exterior of the aircraft and lies in a first geometric plane; and
   sensing, by a second acoustic sensor, second signals of the acoustic signals, wherein the second acoustic sensor is positioned on the exterior of the aircraft and lies in a second geometric plane, different from the first geometric plane.

19. The method of claim 18, wherein determining the second air data parameters comprises determining angle of attack, angle of sideslip, an airspeed, and an air temperature based on the second sensed data.

20. The method of claim 13, wherein sensing, by the low profile pneumatic sensing system of the aircraft, the first sensed data comprises:
   sensing, by first, second, and third static ports positioned at a first location on the aircraft, first data of the first sensed data; and
   sensing, by fourth, fifth, and sixth static ports positioned at a second location on the aircraft opposite the first location, second data of the first sensed data.

* * * * *